United States Patent Office
3,114,633
Patented Dec. 17, 1963

3,114,633
MATERIAL FOR ELECTROPHOTOGRAPHIC AND ELECTRORADIOGRAPHIC PURPOSES
Heinz Schlesinger, Wiesbaden, Germany, assignor, by mesne assignments, to Azoplate Corporation, Murray Hill, N.J., a corporation of New Jersey
No Drawing. Filed Apr. 13, 1960, Ser. No. 21,862
Claims priority, application Germany Apr. 18, 1959
26 Claims. (Cl. 96—1)

Electrophotographic material normally consists of a support on which there is a photoconductive substance, this coating being provided in the absence of light with an electrostatic charge. Then, the material is exposed to light behind a master, or an episcopic image is projected thereon, so that an electrostatic image is formed which corresponds to the master. This image is developed by being briefly contacted with a resin powder, whereupon a visible image is formed which is fixed by heating or by the action of solvents. In this way, an image of the master which is resistant to abrasion is obtained electrophotographically.

For the photoconductive coatings, inorganic substances such as selenium, sulphur or zinc oxide have been used; organic substances, such as anthracene and anthraquinone, have also been employed for this purpose.

A material for electrophotographic purposes, consisting of a support with a photoconductive coating, has now been found in which the photoconductive coating consists wholly or partially of one or more compounds of the general formulae:

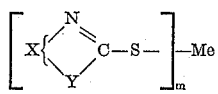

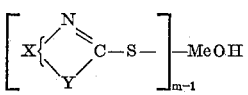

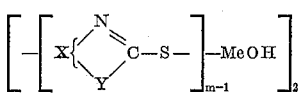

in which X is an aromatic ring, which may have non-ionogenic substituents which have no significant influence on conductivity, Y is oxygen, sulphur or the imino group, the hydrogen of which may be substituted by alkyl, aralkyl or aryl groups, Me is a heavy metal and $m$ is a whole number identical with the valence of the heavy metal.

Exemplary of such compounds are the following:

FORMULA 1

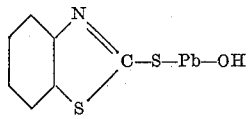

FORMULA 2

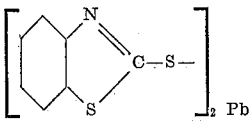

FORMULA 3

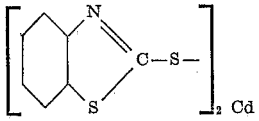

FORMULA 4

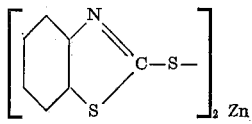

FORMULA 5

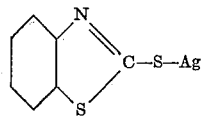

FORMULA 6

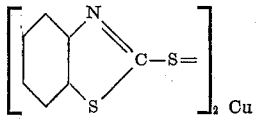

FORMULA 7

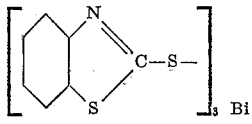

FORMULA 8

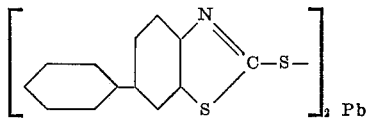

FORMULA 9

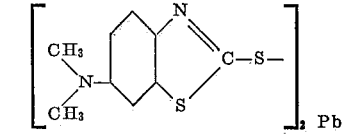

FORMULA 10

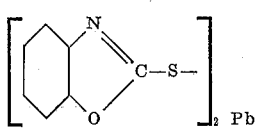

FORMULA 11

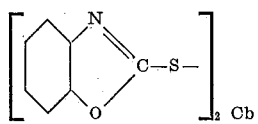

FORMULA 12

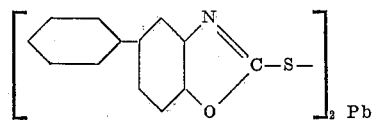

FORMULA 13

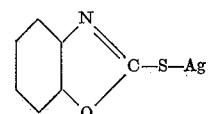

FORMULA 14

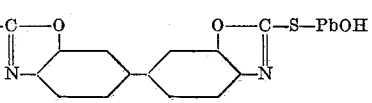

FORMULA 15

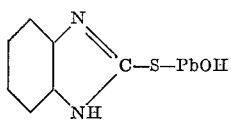

FORMULA 16

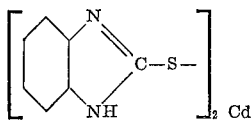

FORMULA 17

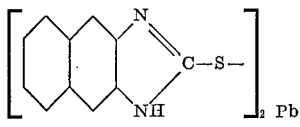

FORMULA 18

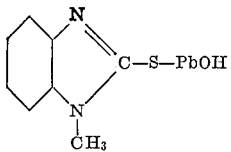

FORMULA 19

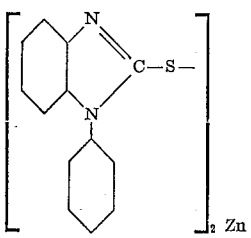

FORMULA 20

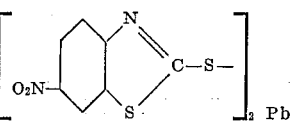

FORMULA 21

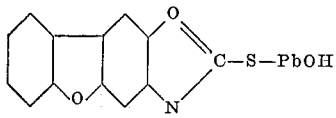

FORMULA 22

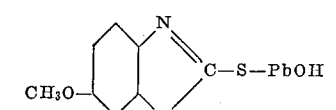

FORMULA 23

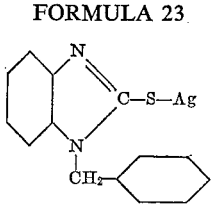

The base materials used as supports may be any that satisfy the requirements of xerography, e.g. metal or glass plates, paper or plates or foils made of electroconductive resins or plastics, such as polyvinyl alcohol, polyamides, and polyurethanes. Other plastics which have the required electroconductive properties, such as cellulose acetate and cellulose butyrate, especially in a partially saponified form, polyesters, polycarbonates, and polyolefines, if they are covered with an electroconductive layer or if they are converted into electroconductive materials, e.g. by chemical treatment or by the introduction of materials which render them electroconductive, may also be used. Generally, electroconductive supports are suitable for the purposes of the present invention. In the sense of the present invention, the term "electroconductive supports" comprises materials having a specific conductivity higher than $10^{-12}$ ohm$^{-1}$.cm.$^{-1}$, preferably higher than $10^{-10}$ ohm$^{-1}$.cm.$^{-1}$.

If paper is used as supporting material, it is preferably pretreated against the penetration of the coating solutions, e.g., it can be treated with the solution of methyl cellulose or polyvinyl alcohol in water or with the solution of an interpolymer of acrylic acid methyl ester and acrylonitrile in a mixture of acetone and methyl-ethyl-ketone, or with solutions of polyamides in aqueous alcohols or with dispersions of such substances.

According to the present invention, the substances used as photoconductive coatings are heavy metal compounds of mercaptobenzthiazoles, mercapto-benzoxazoles or mercaptobenzimidazoles, and their substitution products with non-ionogenic substituents which have no significant influence on conductivity.

Heavy metals include the metals of the third to the fifth groups of the periodic table whose density is greater than 4.3.

Possible substituents are of very varied nature, e.g., aryl, aralkyl, alkyl, cycloalkyl, heterocyclic, alkoxy, carbalkoxy, nitro, nitrile, amino and dialkylamino groups.

Those such as —COOH, —SO$_3$H and metal salts thereof, or —N+(alkyl)$_3$X$^-$, are excluded, i.e., those having polar, ionogenic character and hence being capable of increasing conductivity considerably, i.e., by more than $10^2$.

The following table shows the substances on which the metal compounds in the above list of formulae are based and are examples illustrative of the photoconductors in question. The individual columns are as follows:

(1) The number under which the constitutional formula of the metal compound appears in the above list.

(2) The 2-mercaptobenzthiazole, 2-mercaptobenzoxazole, or 2-mercaptobenzimidazole or substitution products thereof on which the metal compound is based.

(3) The heavy metal used for the preparation of the metal compound.

(4) Color of the metal compound.

| 1 | 2 | 3 | 4 |
|---|---|---|---|
| 1 | 2-mercapto-benzthiazole | lead | light yellow. |
| 2 | do | do | yellow. |
| 3 | do | cadmium | colorless. |
| 4 | do | zinc | light yellow. |
| 5 | do | silver | Do. |
| 6 | do | copper | orange-colored. |
| 7 | do | bismuth | Do. |
| 8 | 2-mercapto-6-phenyl-benzthiazole | lead | light yellow. |
| 9 | 2-mercapto-6-dimethyl-amino-benzthiazole | cadmium | light green. |
| 10 | 2-mercapto-benzoxazole | lead | colorless. |
| 11 | do | cadmium | Do. |
| 12 | 2-mercapto-5-phenyl-benzoxazole | lead | yellow. |
| 13 | 2-mercapto-benzoxazole | silver | colorless. |
| 14 | 6-(2'-mercapto-benzoxazolyl-(6'))-2-mercapto-benzoxazole | lead | yellow. |
| 15 | 2-mercapto-benzimidazole | do | colorless. |
| 16 | do | cadmium | Do. |
| 17 | 2-mercapto-napthth-2',3'-imidazole | lead | yellow. |
| 18 | 1-methyl-2-mercapto-benzimidazole | do | colorless. |
| 19 | 1-phenyl-2-mercapto-benzimidazole | zinc | Do. |
| 20 | 2-mercapto-6-nitro-benzthiazole | lead | yellow. |
| 21 | 2-mercapto-4,5-(diphenyl-eneoxido-(2',3'))-imidazole | do | yellow-green. |
| 22 | 2-mercapto-6-methoxy benzimidazole | do | light yellow. |
| 23 | 1-benzyl-2-mercapto-benzimidazole | silver | colorless. |

The preparation of the substances on which the photoconductive substances are based is by known processes or by analogy to known processes. The conversion to the heavy metal compounds is in general a smooth process. For the preparation of these metal compounds, the mercapto compounds can be dissolved in a water-miscible solvent such as ethanol and a corresponding amount of an aqueous solution of the heavy metal salt is introduced dropwise with stirring. The reaction product then separates out and is isolated by suction filtration and drying. The heavy metal compounds contain the metals in a form which is presumably complex.

The preparation of the basic heavy metal compounds is also, in general, simple. There are various methods, e.g., the mercapto compounds may be dissolved in an aqueous alkaline medium, such as concentrated ammonia solution, sodium hydroxide solution or potassium hydroxide solution and this solution is then added to a heated aqueous solution of the metal salt in question, or to a solution of the metal oxide in alkali solutions.

By choice of a suitable solvent, which is apparent to those skilled in the art, and in some cases by the use of an excess of one component, the compounds can thus be prepared.

For the preparation of the electrophotographic material the photoconductive heavy metal compounds are preferably suspended in organic solvents such as benzene, acetone, methylene chloride or ethyleneglycol monomethylether or other organic solvents or in mixtures of such solvents, and resins are then advantageously added to the suspension. These suspensions are coated upon the supporting material in the normal manner, e.g., by immersion processes, painting or roller application or by spraying. The material is then heated so that the solvent will be removed.

A number of the compounds in question can be applied together to the supporting material or the compounds can be applied in association with other photoconductive substances.

Resins which may be added to the photoconductive coatings include natural resins such as balsam resins, colophony and shellac, synthetic resins such as phenol resins modified with colophony, and other resins in which colophony constitutes the major part, also coumarone resins, indene resins and those included under the collective term "synthetic lacquer resins." According to the Saechtling-Zebrowski Plastics Handbook, 11th edition, 1955, page 212 et seq., these include the following: processed natural substances such as cellulose ethers; polymers such as vinyl polymers, e.g., polyvinyl chloride, polyvinylidene chloride, polyvinyl acetate, polyvinyl acetals, polyvinyl ethers, polyacrylic and polymethacrylic acid esters, as also polystyrene and isobutylene and chlorinated rubber; polycondensates, e.g., polyesters, such as phthalate resin, alkyd resin, maleic resinate, maleic acid/colophony mixed esters of higher alcohols, phenol-formaldehyde resin, in particular colophony-modified phenol-formaldehyde condensates, urea-formaldehyde condensates, melamine formaldehyde resins, aldehyde resins, ketone resins, particularly so-called AW 2 resins, xylene formaldehyde resins, polyamides, and polyadducts, such as polyurethanes. Also, polyolefines such as various polyethylenes and polypropylenes and phthalic acid polyesters such as terephthalic and isophthalic acid ethyleneglycol polyesters are possible.

If the photoconductive compounds of the invention are used in association with the resins described above, the proportion of resin to photoconductive substance can vary very greatly, but the content of photoconductive substance should be at least 20%. Mixtures of from 2 parts of resin and one part of photoconductive substance to two parts of photoconductive substance to one part of resin are to be preferred. Mixtures of the two substances in equal parts by weight are particularly favorable.

The light-sensitivity of these photoconductive coatings is in the ultra-violet region, but extends to the X-ray wave lengths. With high-pressure mercury vapor lamps, which transmit a large amount of ultra-violet rays, and with X-ray sources, comparatively short exposure times can be achieved.

By the addition of sensitizers it is possible to improve the spectral sensitivity of the conductive coatings to the visible part of the spectrum, so that even with ordinary light sources short exposure times can be achieved. Even very small additions, e.g., less than 0.01 percent, have considerable effect. In general, however, the amount of "sensitizer" to be added to the photoconductive coatings is from 0.01 to 5 percent, and preferably 0.1 to 3 percent. The addition of larger quantities is possible but, in general, is not accompanied by any considerable increase in sensitivity.

Suitable sensitizers are constituted in particular by dyestuffs, some of which are listed by way of example below. They are taken from Schultz' "Farbstofftabellen" (7th edition, 1931, 1st vol.).

Triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 83, p. 364) and Fast Acid Eosin G (No. 870, p. 368), as also phthaleins such as Eosen S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptacyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); syanine dyestuffs, e.g. Cyanine (No. 921, p. 394) and chlorophyll.

For the production of copies with the electrocopying material of the invention, the photoconductive coating is charged positively or negatively by means of, for example, a corona discharge with a charging apparatus maintained at 6000–7000 volts. The electrocopying material is then exposed to light in contact with a master; alternatively, an episcopic or diascopic image is projected thereon. An electrostatic image corresponding to the master is thus produced on the material. The invisible image is developed by contact with a developer consisting of carrier and toner. The carriers used may be fine glass balls, iron powder or fine plastic balls. The toner consists of a resin-carbon black mixture or a pigmented resin. The toner is generally used in a grain size of 1 to 100μ, preferably 5–30μ. The developer may also consist of a resin or pigment suspended in a non-conductive liquid in which resins may be dissolved. The image made visible by development is then fixed, e.g., by heating with an infrared radiator to 100–170° C., preferably 120–150° C. or by treatment with solvents such as trichloroethylene, carbon tetrachloride or ethyl alcohol, or steam. If a polarity of the electrical charge is used which is opposite to that of the toner contained in the developer, images corresponding to the master characterized by good contrast effect are obtained. By changing the polarity of the corona discharge it is thus possible to obtain reversal images with the same master and the same toner.

The photoconductivity of the substances according to the present invention is superior to that of known organic photoconductors, such as anthracene, benzidine and anthraquinone.

If transparent supporting material is used, the electrophotographic images can also be used as masters for the production of additional copies on any type of light-sensitive sheets.

If translucent supports are used for photoconductive layers such as are provided by the invention, reflex images can be produced also.

The electrophotographic material constituted in accordance with the invention has the particular advantage that it gives images rich in contrast with X-ray irradiation also.

The method of preparation of the photoconductive material is illustrated in the following examples:

*Example I*

8 parts by weight of a ketone-aldehyde condensation resin ("Kunstharz AP") are dissolved in 120 parts by volume of benzene. 8 parts by weight of the basic lead compound of the 2-mercapto-benzthiazole corresponding to Formula 1 are added to this solution and the suspension produced is finely ground in a ball mill. The suspension is then coated by means of a casting device upon paper the surface of which has been treated against the penetration of organic solvents, and dried. The dry coating is furnished with a negative electric charge by corona discharge from a charging device maintained at about 6000 volts. It is then exposed under a master to the light of a high pressure mercury vapor lamp and dusted over with a developer in known manner.

The developer consists of fine glass balls and a very finely divided resin-carbon black mixture. The black pigmented resin adheres to the parts of the coating not struck by light during the exposure and an image corresponding to the master becomes visible which is slightly heated and thereby fixed.

The developer used above consists of 100 parts by weight of tiny glass balls of a grain size of 350–400μ and 2.5 parts by weight of toner of a grain size of 1–100μ, preferably 5–30μ. The toner is prepared from 30 parts by weight of polystyrene (Polystyrol LG), 30 parts by weight of resin-modified maleic acid resin ("Beckacite" K–105) and 3 parts by weight of carbon black ("Peerless Black" 552), which are melted together, ground and screened.

For the preparation of the compound corresponding to Formula 1, 55.1 parts by weight of 2-mercapto-benzthiazole are dissolved in 500 parts by volume of concentrated ammonia solution and the solution is introduced dropwise, with stirring, into a solution, heated to 80° C. of 113.7 parts by weight of lead disacetate.3H$_2$O in 250 parts by volume of water. Afterwards, the reaction mixture is heated to boiling for 10 minutes; the reaction product then separates out. It is separated by suction filtration, washed with water and dried.

The compound can also be obtained by the dropwise introduction, with stirring, of a solution of 72.3 parts by weight of lead dihydroxide in 900 parts by volume of 44 percent sodium hydroxide solution, into a solution of 55.1 parts by weight of 2-mercapto-benzthiazole in 130 parts by volume of 10 percent sodium hydroxide solution.

*Example II*

Paper is coated as described in Example I and provided by corona discharge with a positive charge. After the paper foil has been exposed to light under a master, the image formed is developed by dusting over with a developer as described in Example I, the carrier used being tiny glass balls coated with resin, e.g. coumarone resin (Cumaronharz 601/90), and the toner being the same as mentioned in Example I. A very good image corresponding to the master and rich in contrast is similarly obtained.

*Example III*

The procedure described in Example I is followed, but instead of the ketone-aldehyde condensation resin the same quantity of chlorinated polyvinyl chloride ("Rhenoflex") is used, this being dissolved in 80 parts by volume of methyl-ethyl-ketone and 40 parts by volume of toluene.

*Example IV*

3 parts by weight of resin-modified maleic acid resin ("Beckacite" K 105) are dissolved in 20 parts by volume of toluene. To this solution is added a mixture consisting of 0.75 part by weight of the cadmium compound of 2-mercapto-benzthiazole corresponding to Formula 3, 0.75 part by weight of the lead compound of 2-mercapto-5-phenyl-benzoxazole corersponding to Formula 12 and 0.75 part by weight of the basic lead compound of 2-mercapto-benzimidazole corresponding to Formula 15. The suspension obtained is very finely ground and then coated upon paper. The preparation of an electrophotographic image is as described in Example I.

*Example V*

2 parts by weight of zinc resin ("Erkazit Zinkharz" 165) are dissolved in 15 parts by volume of toluene. 1 part by weight of the basic lead compound of 2-mercapto-benzimidazole, corresponding to Formula 15, is suspended in this solution and the suspension is very finely ground. It is coated by means of a casting device upon an aluminum foil and, after the evaporation of the toluene, a firmly adherent coating remains. An electrophotographic image is then prepared in the usual way.

*Example VI*

10 parts by weight of polyvinyl chloride ("Rhenoflex") are dissolved in a mixture of 100 parts by volume of methyl-ethyl-ketone and 50 parts by volume of toluene. 10 parts by weight of the lead compound of 2-mercapto-benzthiazole, corresponding to Formula 2, are added thereto and the suspension is ground in a ball mill. The very fine suspension thus obtained is used for the mechanical coating of paper which has been pretreated against the penetration of organic solvents. After the evaporation of the two solvents, a coating remains. Electrophotographic images can be obtained therewith in known manner.

For the preparation of the compound corresponding to Formula 2, 37.9 parts by weight of lead diacetate·3H$_2$O dissolved in 100 parts by volume of water are introduced dropwise, with stirring, into a solution of 36.7 parts by weight of 2-mercapto-benzthiazole in 400 parts by volume of ethanol and the product which precipitates out is separated by suction, washed and dried.

*Example VII*

An electrophotographic paper coated and charged as described in Example I is exposed under a master to X-rays, the master used being, for example, a metal plate. The paper is then dusted over with an electrophotographic developer in the usual manner whereupon an image corresponding to the master is produced.

*Example VIII*

A suspension is prepared as described in Example VI. Before this suspension is ground in the ball mill, however, a solution of 0.02 part by weight of Rhodamine B Extra ("Farbstofftabellen," Schultz, 7th edition, vol. I, No. 864) in 2 parts by volume of methanol are added thereto. The finely ground suspension is then mechanically coated upon paper and dried. A 100-watt incandescent lamp is used for the preparation of electrophotographic images.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a compound selected from the group consisting of

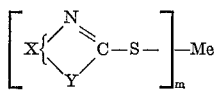

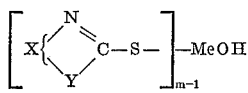

and

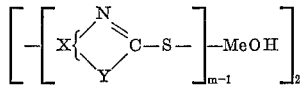

in which X is an ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

2. An electrophotographic material according to claim 1 in which the photoconductive layer contains a dyestuff sensitizer.

3. An electrophotographic material according to claim 1 in which the photoconductive layer contains a resin.

4. An electrophotographic material comprising a conductive support layer and a photoconductive insulating layer, the latter comprising a compound having the formula

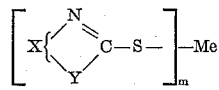

in which X is an ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

5. An electrophotographic material comprising a conductive support layer and a photoconductive insulating layer, the latter comprising a compound having the formula

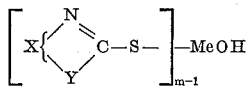

in which X is an ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

6. An electrophotographic material comprising a conductive support layer and a photoconductive insulating layer, the latter comprising a compound having the formula

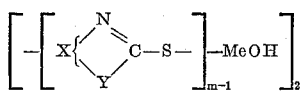

in which X is an ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is in integer corresponding to the valence of the heavy metal.

7. An electrophotographic material comprising a conductive support layer and a photoconductive insulating layer, the latter comprising a compound having the formula

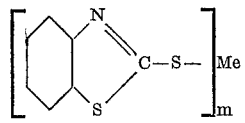

in which Me is a heavy metal and $m$ is an integer corresponding to the valence of the heavy metal.

8. An electrophotographic material comprising a conductive support layer and a photoconductive insulating layer, the latter comprising a compound having the formula

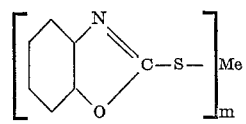

in which Me is a heavy metal and $m$ is an integer corresponding to the valence of the heavy metal.

9. An electrophotographic material comprising a conductive support layer and a photoconductive insulating layer, the latter comprising a compound having the formula

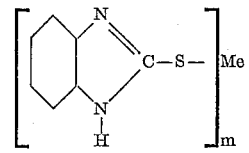

in which Me is a heavy metal and $m$ is an integer corresponding to the valence of the heavy metal.

10. A photographic reproduction process which comprises electrostatically charging a supported photoconductive insulating layer, exposing the charged material to radiation under a master and developing the resulting image with an electroscopic material, the photoconductive layer comprising a compound selected from the group consisting of

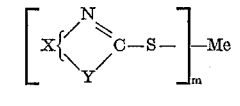

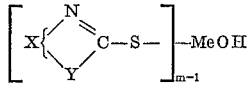

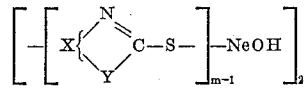

in which X is an aromatic ring ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

11. A process according to claim 10 in which the photoconductive layer contains a dyestuff sensitizer.

12. A process according to claim 10 in which the photoconductive layer contains a resin.

13. A photographic reproduction process which comprises electrostatically charging a supported photoconductive insulating layer exposing the charged material to radiation under a master and developing the resulting image with an electroscopic material, the photoconductive layer comprising a compound having the formula

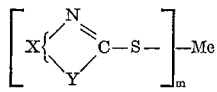

in which X is an aromatic ring ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy material.

14. A photographic reproduction process which comprises electrostatically charging a supported photoconductive insulating layer, exposing the charged material to radiation under a master and developing the resulting image with an electroscopic material, the photoconductive layer comprising a compound having the formula

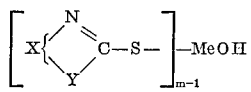

in which X is an aromatic ring ortho arylene group, which may have non-ionogenic substituents having no significant influence on the electrical conductivity of the compound, Y is selected from the group consisting of ogygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

15. A photographic reproduction process which comprises electrostatically charging a supported photoconductive insulating layer, exposing the charged material to radiation under a master and developing the resulting image with an electroscopic material, the photoconductive layer comprising a compound having the formula

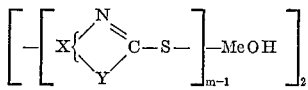

in which X is an ortho arylene group, which may have non-ionogenic substituents having no significant influence on the electrical conductivity of the compound, Y is selected from the group consisting of oxygen, sulfur and the imino group, the hydrogen of which may be substituted by a radical selected from the group consisting of alkyl, aryl, and aralkyl, Me is a heavy metal, and $m$ is an integer corresponding to the valence of the heavy metal.

16. A photographic reproduction process which comprises electrostatically charging a supported photoconductive insulating layer, exposing the charged material to radiation under a master and developing the resulting image with an electroscopic material, the photoconductive layer comprising a compound having the formula

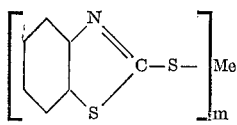

in which Me is a heavy metal and $m$ is an integer corresponding to the valence of the heavy metal.

17. A photographic reproduction process which comprises electrostatically charging a supported photoconductive insulating layer, exposing the charged material to radiation under a master and developing the resulting image with an electroscopic material, the photoconductive layer comprising a compound having the formula

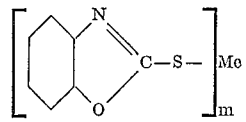

in which Me is a heavy metal and $m$ is an integer corresponding to the valence of the heavy metal.

18. A photographic reproduction process which comprises electrically charging a supported photoconductive insulating layer, exposing the charged material to radiation under a master and developing the resulting image with an electroscopic material, the photoconductive layer comprising a compound having the formula

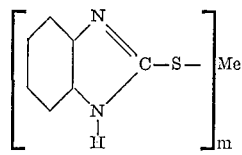

in which Me is a heavy metal and $m$ is an integer corresponding to the valence of the heavy metal.

19. An electrophotographic material comprising a conductive support layer and a photoconductive insulating layer, the latter comprising a compound having the formula

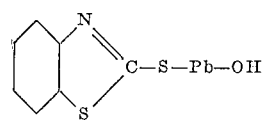

20. An electrophotographic material comprising a conductive support layer and a photoconductive insulating layer, the latter comprising a compound having the formula

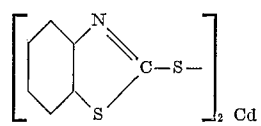

21. An electrophotographic material comprising a conductive support layer and a photoconductive insulating layer, the latter comprising a compound having the formula

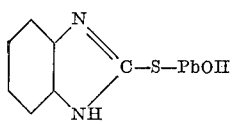

22. An electrophotographic material comprising a conductive support layer and a photoconductive insulating layer, the latter comprising a compound having the formula

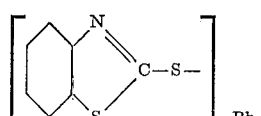

23. A photographic reproduction process which comprises electrostatically charging a supported photoconductive insulating layer, exposing the charged material to radiation under a master and developing the resulting image with an electroscopic material, the photoconductive layer comprising a compound having the formula

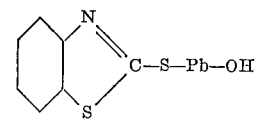

24. A photographic reproduction process which comprises electrostatically charging a supported photoconductive insulating layer, exposing the charged material to radiation under a master and developing the resulting image with an electroscopic material, the photoconductive layer comprising a compound having the formula

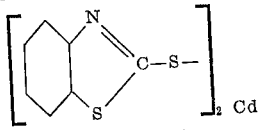

25. A photographic reproduction process which comprises electrostatically charging a supported photoconductive insulating layer, exposing the charged material to radiation under a master and developing the resulting image with an electroscopic material, the photoconductive layer comprising a compound having the formula

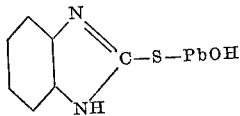

26. A photographic reproduction process which comprises electrostatically charging a supported photoconductive insulating layer, exposing the charged material to radiation under a master and developing the resulting image with an electroscopic material, the photoconductive layer comprising a compound having the formula

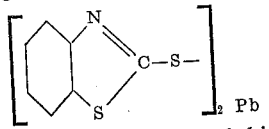

References Cited in the file of this patent
UNITED STATES PATENTS

| | | |
|---|---|---|
| 1,637,791 | Teppema | Aug. 2, 1927 |
| 2,091,345 | Williams | Aug. 31, 1937 |
| 2,108,018 | Morris | Feb. 8, 1938 |
| 2,170,670 | Williams | Aug. 22, 1939 |
| 2,777,853 | Steiger | Jan. 15, 1957 |
| 2,809,973 | Gaertner | Oct. 15, 1957 |
| 2,901,349 | Schaffert et al. | Aug. 25, 1959 |
| 2,940,848 | Kostelec et al. | June 14, 1960 |

OTHER REFERENCES

Memmler: Science of Rubber, Reinhold Pub. Co. (1934), pp. 326–329.

Sebrell et al.: Jour. of the Amer. Chem. Soc., vol. 45, pp. 2390–2399 (1923).

UNITED STATES PATENT OFFICE
CERTIFICATE OF CORRECTION

Patent No. 3,114,633                                      December 17, 1963

Heinz Schlesinger

It is hereby certified that error appears in the above numbered patent requiring correction and that the said Letters Patent should read as corrected below.

Column 2, formula 6 should appear as shown below instead of as in the patent:

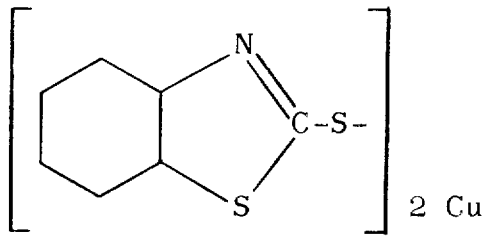

column 10, line 63, and column 11, lines 11 and 30, strike out "aromatic ring", each occurrence; column 12, line 11, for "electrically" read -- electrostatically --.

Signed and sealed this 26th day of May 1964.

(SEAL)
Attest:

ERNEST W. SWIDER                                    EDWARD J. BRENNER
Attesting Officer                                 Commissioner of Patents